United States Patent
Jabaji et al.

(10) Patent No.: US 6,924,621 B2
(45) Date of Patent: Aug. 2, 2005

(54) SYSTEM AND METHOD FOR CONTROLLING ELECTRIC LOAD AND BATTERY CHARGE IN A VEHICLE

(75) Inventors: Issam Jabaji, Morton Grove, IL (US); Shadi Jabaji, Morton Grove, IL (US)

(73) Assignee: C.E. Niehoff & Co., Evanston, IL (US)

(*) Notice: Subject to any disclaimer, the term of this patent is extended or adjusted under 35 U.S.C. 154(b) by 0 days.

(21) Appl. No.: 10/140,901

(22) Filed: May 7, 2002

(65) Prior Publication Data

US 2003/0210014 A1 Nov. 13, 2003

(51) Int. Cl.[7] .................................................. H02J 7/14
(52) U.S. Cl. ........................ 320/123; 320/117; 320/104
(58) Field of Search ................................. 320/123, 117, 320/116, 127, 132, 133, 104, 135, 136; 324/427, 430

(56) References Cited

U.S. PATENT DOCUMENTS

| | | | | |
|---|---|---|---|---|
| 3,763,415 A | | 10/1973 | Ownby | ........................ 320/117 |
| 4,218,717 A | * | 8/1980 | Shuster | ........................ 361/79 |
| 4,639,657 A | * | 1/1987 | Frierdich | ...................... 322/59 |
| 4,968,943 A | * | 11/1990 | Russo | ......................... 324/537 |
| 5,488,283 A | | 1/1996 | Dougherty et al. | ......... 307/10.1 |
| 5,619,417 A | | 4/1997 | Kendall | ......................... 702/63 |
| 5,640,071 A | * | 6/1997 | Malaspina et al. | .......... 318/139 |
| 5,705,929 A | * | 1/1998 | Caravello et al. | ........... 324/430 |
| 5,977,652 A | | 11/1999 | Frey et al. | .................. 307/10.1 |
| 6,037,749 A | * | 3/2000 | Parsonage | ................... 320/132 |
| 6,046,512 A | | 4/2000 | Heise | ......................... 307/10.1 |
| 6,222,341 B1 | | 4/2001 | Dougherty et al. | ......... 320/104 |
| 6,232,674 B1 | | 5/2001 | Frey et al. | .................. 307/10.1 |
| 6,304,054 B1 | | 10/2001 | Granberg et al. | ........... 320/104 |

* cited by examiner

*Primary Examiner*—Michael Sherry
*Assistant Examiner*—Lawrence Luk
(74) *Attorney, Agent, or Firm*—Brinks Hofer Gilson & Lione (57) ABSTRACT

A load and battery charge device in a vehicle electrical system controllably disconnects a battery or other stored energy source from the electrical system when the battery state causes the system voltage to operate below a desired threshold. The device filters generator ripple voltage during batteryless operation to maintain an acceptable ripple voltage. The load and battery control device operates to recharge the battery that is disconnected from the vehicle electrical system at a controlled voltage independent of the vehicle electrical system voltage. The load and battery control device controls the rate of battery recharge so as to avoid overburdening the vehicle electrical system and then reconnects the battery to the vehicle electrical system once the battery voltage has reached a minimum threshold.

28 Claims, 3 Drawing Sheets

SYSTEM AND METHOD FOR CONTROLLING ELECTRIC LOAD AND BATTERY CHARGE IN A VEHICLE

REFERENCE TO COMPUTER PROGRAM LISTINGS SUBMITTED ON COMPACT DISK

A compact disk appendix is included containing computer program code listings pursuant to 37 C.F.R. 1.52(e) and is hereby incorporated by reference. The compact disk contains program code files in ASCII format. The total number of compact disks is 1 and the files included on the compact disk are as follows:

| Creation Date | Creation Time | File Size (Kilobytes) | File Name |
|---|---|---|---|
| May 3, 2002 | 11:56 a | 3 | Defines |
| May 3, 2002 | 12:03 p | 15 | LBCD |
| May 3, 2002 | 12:04 p | 4 | Registers |

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF THE INVENTION

This application relates to motor vehicle electrical systems. More specifically, this application relates to an electric load and battery charge control device and method.

BACKGROUND

Automotive electrical systems are generally designed to match the generator capacity to the normal operating electrical loads. However, due to the numerous electrical devices that are now used in various types of vehicles, and the likelihood that at least some of these devices will be used when the engine is not operating and the generator is not producing power, the incidence of undercharged batteries has become common. Any vehicle that is not used for a few weeks while the battery remains connected to the electrical system is likely to have undercharged or discharged batteries. This is also true for trucks and recreational vehicles that use auxiliary batteries to power household amenities when the vehicle is stopped. The auxiliary batteries are isolated from the main automotive batteries, so they can be independently discharged. When the vehicle is started, either by slave starting or by using the isolated batteries that were not discharged, the high charge load from the discharged battery, in addition to normal operating electrical loads, may exceed the generator capacity. When this happens, the system voltage is well below normal and there is little chance for the generator to recharge the batteries as well as maintain the regulated voltage.

Low voltages induced by electrical overload can impair operation of electronic devices needed for normal operation of the vehicle. A short circuit in the battery or in its cabling can completely inhibit the generator from producing output. Discharged batteries also have significantly less filtering capacity to reduce the generator ripple voltage that is the result of rectifying the generator's alternating current output. The peak-to-peak ripple voltage when the battery is disconnected may in some cases be equal to the direct current battery voltage. Excessive ripple voltage due to discharged batteries can disrupt various electronic fault detection circuits and give false alarms concerning alternator integrity.

Accordingly, there is a need for a vehicle battery charging and load control system that reduces or eliminates the disruption to the regulated voltage necessary for running the electrical devices connected to a vehicle electrical system that can occur from high charging loads demanded by discharged batteries.

SUMMARY

In order to maintain a stable regulated voltage in a vehicle electrical system while still adequately recharging the batteries associated with the electrical system, a system and method for controlling electric load and battery charge in motor vehicle electrical systems is disclosed.

According to a first aspect of the invention, a system is disclosed including a generator electrically coupled with a vehicle electrical system, a battery electrically coupled with the vehicle electrical system via a battery disconnect switch, and a control circuit in communication with the battery disconnect switch. The control circuit is configured to control the battery disconnect switch to disconnect the battery from the vehicle electrical system when a voltage produced by the generator is below a desired threshold. The control circuit is also configured to control the battery disconnect switch to reconnect the battery to the vehicle electrical system when a voltage of the battery is above a desired battery voltage threshold. While the battery is disconnected from the vehicle electrical system, a filter circuit provides the ripple voltage reduction to the alternator output that is required for normal direct current operation of the vehicle electrical system. Preferably, a battery charging circuit in the control circuit adjustably recharges the battery while the battery is disconnected from the vehicle electrical system. The battery charging circuit uses excess generator capacity so that the battery recharging process is decoupled from the vehicle electrical system normal operation.

According to a second aspect of the invention, a method is disclosed for controlling electric load and battery charge in a vehicle electrical system, the method includes monitoring the voltage of a vehicle electrical system and disconnecting a rechargeable source of stored energy, such as a battery, from the vehicle electrical system if the system voltage falls below a cutoff threshold. The source of stored energy is then controllably charged with energy from a generator in the vehicle electrical system such that the operating voltage of the vehicle electrical system is maintained at a regulated voltage setting. The rechargeable source of stored energy is reconnected to the vehicle electrical system when the voltage at the rechargeable source of stored energy is equal to a restoration threshold. During the recharging process, the vehicle electrical system operates with energy from the generator and with or without other energy storage devices.

Other features and advantages of the invention will become apparent to those of ordinary skill in the art upon review of the following drawings, detailed description and claims.

DETAILED DESCRIPTION OF THE PRESENTLY PREFERRED EMBODIMENTS

Figure 1:
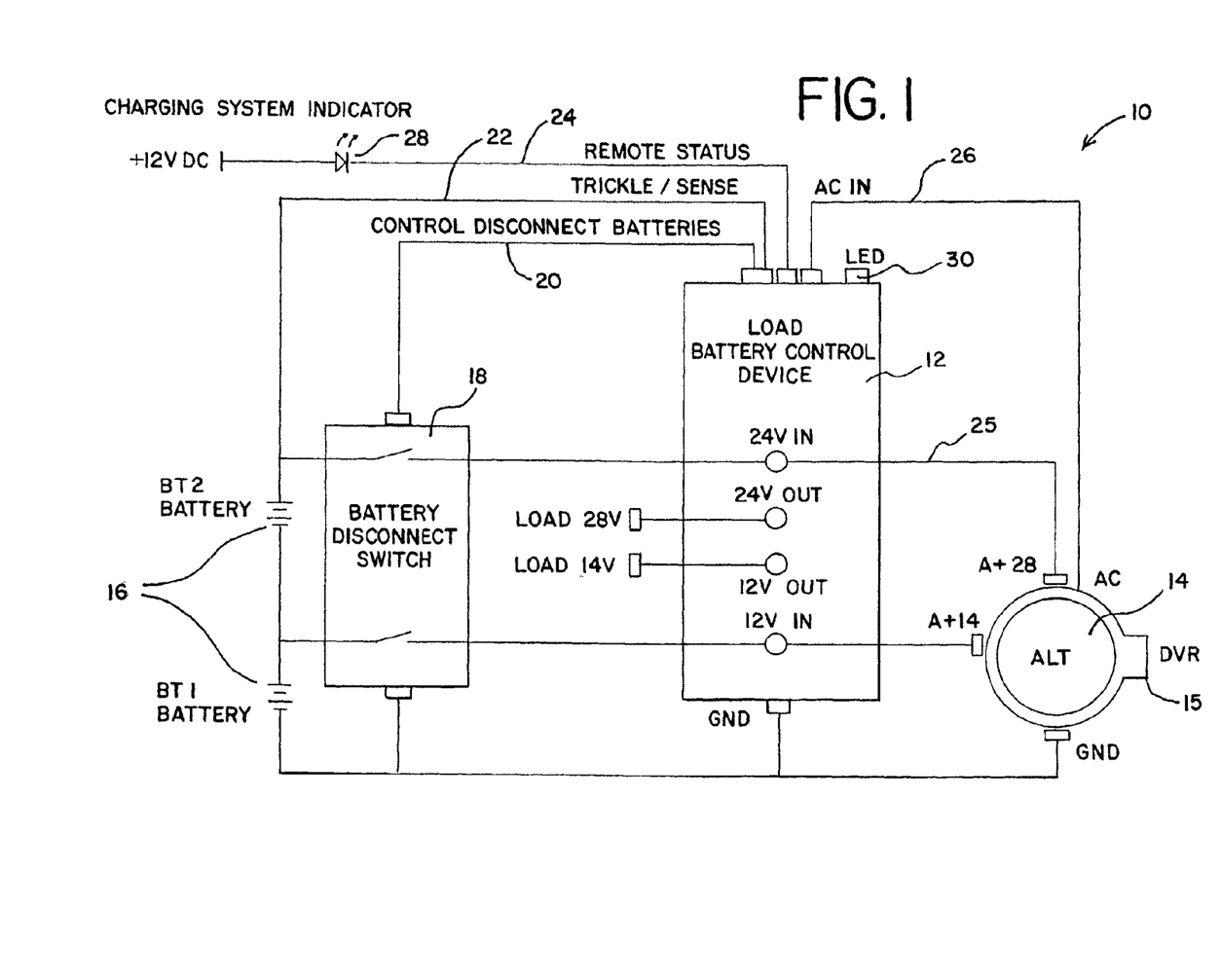
FIG. 1 shows a block diagram of a vehicle electrical system according to a preferred embodiment.

FIG. 1 illustrates a block diagram of a vehicle electrical system 10 incorporating a preferred load and battery control device (LBCD) 12. An alternator 14 generates electric power for the system 10 when the vehicle engine is running, and one or more batteries 16 switchably connected to the electrical system 10 provide electrical power when the vehicle engine is not running and when the engine is first started. The LBCD 12 is in communication with a battery disconnect switch 18 via a battery control line 20. The LBCD 12 is also in electrical communication with the battery 16 via a trickle charge/sense line 22 that allows the LBCD 12 to controllably recharge the battery and provides information on the battery's current state of charge.

Other connections to the LBCD 12 include a remote status line 24 and an AC in line 26. The remote status line 24 preferably connects with a charge system indicator, such as a light emitting diode (LED) 28 or other indicator, that may be positioned in the field of view of a driver for the vehicle. The LBCD may send charge status information to the driver by activating the LED 28. In one embodiment, the LED 28 may be operated in the same manner as the standard warning light in automobiles where a warning is sent to the driver that the battery is undercharged or otherwise defective simply by illuminating the LED 28. In other embodiments, the LED 28 may be operated to flash in certain patterns, or it may be replaced with a variety of indicator types that provide more detailed information to the driver of the status of the battery and electrical system. The AC in line 26 connects the LBCD 12 with the alternator 14 so that the LBCD 12 is always aware of the operating state of the alternator 14. The alternator output line 25 provides a means for the LBCD to monitor the voltage output of the alternator 14. Another LED 30 is preferably located on the LBCD 12 that is useful for providing diagnostic information to mechanics maintaining or repairing the vehicle.

Figure 2:
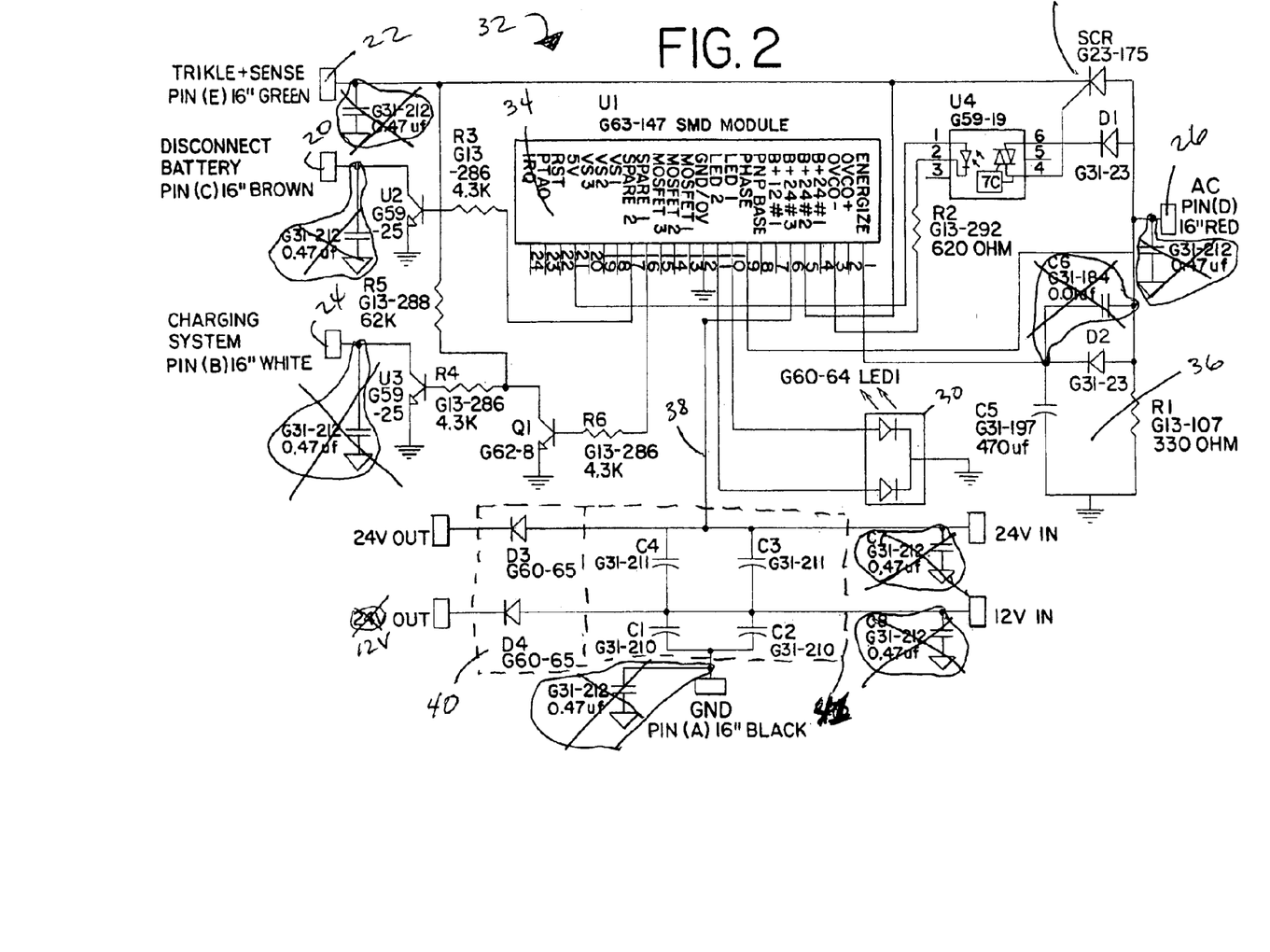
FIG. 2 is a schematic of one preferred LBCD for use in the vehicle electrical system of FIG. 1.

In one embodiment, as shown in FIG. 2, the LBCD 12 is a circuit 32 controlled by a processor module 34. The processor module 34 preferably includes a microprocessor, a processor clock, and a power supply. In one preferred embodiment, the microprocessor is a 68C08 processor having internal flash memory available from Motorola, Inc. of Schaumburg, Ill. The internal clock may be a crystal-type oscillator or other oscillator mechanism known to those of skill in the art, and the power supply may be a discrete or integrated circuit configured to supply the processor module 34 with the appropriate DC voltages. It is contemplated that the processor module may be a combination of individual discrete or separate integrated circuits packaged in a single housing or it may be fabricated in a single integrated circuit.

The processor module 34 is configured to control charging current to the battery 16 from the alternator 14 by switchably controlling power from the AC input 26 through a switch, such as an SCR (silicon controlled rectifier) 27 that separates the trickle charge/sense line 22 electrically connected with the battery 16 from the AC in line 26. In order to provide the SCR 27 with the proper gate signal to turn on or off the SCR, the processor module 34 uses an optocoupler U4. The optocoupler U4 also provides the processor module 34 with significant isolation from the SCR 27. Although the gate control device is shown as an optocoupler U4, other switching mechanisms and control circuits may be used. Additionally, while the SCR 27 is preferred, other controllable devices apparent to those of ordinary skill in the art may be used such as transistors or AC to DC (alternating current to direct current) converters. In the embodiment of FIGS. 1–2, the alternator 14 is preferably generating a three phase AC output and AC in line 26 preferably carries a single phase of the three phase AC output. In other embodiments, the alternator may generate other numbers of AC output phases (e.g., six), or two or more phases of the alternator output may be controlled via the processor module to recharge the battery. In these other embodiments, the type of controllable device, such as an SCR, used by the processor module to manage battery recharging may be selected according to the sensitivity and power requirements necessary for the particular vehicle electrical system.

The processor module 34 is powered from a power supply 36 that derives its input from the AC in line 26. The power supply 36 is made up of rectifier diode D2, filter capacitor C5, and bias resistor R1. The processor module 34 is also electrically connected to the diagnostic LED 30. The operation of the diagnostic LED 30 will be explained in greater detail below. The processor module 34 also sends signals over the remote status line 24 to the LED 28 that provides charging system status. Typically, transistor U3 is on and, when the alternator 14 reaches its steady state output, the processor module 34 turns on Q1 which then turns U3 off so that the LED 28 seen by the vehicle operator is off.

The processor module 34 controls the battery disconnect switch 18 through transistor U2 attached to the battery disconnect line 20. When the processor module senses the need to disconnect the battery 16, it activates U2. When U2 is activated, U2 in turn activates the battery disconnect switch 18 which completely disconnects the battery 16 from the electrical system load so that the battery 16 is isolated from the system and can only be charged through the trickle charge/sense line 22. The processor module of the LBCD 12 senses the output system voltage of the alternator 14 over a sense line 38. Sense line 38 connects to the output of the alternator and monitors the vehicle electrical system regulated voltage maintained by the alternator's voltage regulator 15.

In one embodiment, a reverse polarity protection circuit 40 is also implemented in the circuit 32. The reverse polarity protection circuit may consist of diodes D3, D4 arranged to protect the components hooked up to the vehicle electrical system so that vehicle electrical loads will not be damaged if, for example, the battery 16 is somehow inadvertently connected with the terminals reversed. In the embodiment of FIGS. 1–2, the diodes D3, D4 may be power diodes rated for 200 Amps or more. The circuit 32 preferably also includes a ripple filter 41 for controlling the peak-to-peak ripple of the alternator output when the battery is disconnected from the vehicle electrical system. In FIG. 2, the ripple filter 41 is made up of capacitors C1–C4. Capacitors C1 and C2 are 120,000 microfarad ($\mu$F) capacitors linked in parallel between the 12 volt line and ground and capacitors C3 and C4 are 82,000 $\mu$F capacitors connected in parallel between the 24 volt line and the 12 volt line.

Utilizing the system 10 described above, one embodiment of the operation of the LBCD 12 is now described. When the vehicle is first started, the battery disconnect switch 18 is closed. If a defective or discharged battery state is detected, then the battery disconnect switch 18 is opened by the LBCD 12 so that the battery 16 is disconnected from the alternator 14. As in standard in motor vehicle electrical systems, engine start up begins when the vehicle ignition switch activates the engine cranking circuit, starting circuit, and DVR 15 (digital voltage regulator that controls alternator operation) with a signal from the battery 16. As is the case with standard voltage regulators, the DVR goes through its typical start up procedure that is completed when the engine is running and the alternator system is checked for integrity.

In a single voltage vehicle electrical system, e.g. 28 Volts only, the LBCD can be operated in conjunction with any voltage regulator, including an analog voltage regulator, capable of regulating alternator voltage when a battery is absent from the circuit. A conventional dual voltage regulator operated with the LBCD as described herein, may require improved voltage reference sensitivity and response to maintain the intended voltage regulation during battery-less operation. This can be achieved by a variety of circuit or programming techniques available to those practiced in the art, e.g. faster sampling rate. Suitable voltage regulators include the N3106 regulator for single voltage operation and the N3207 digital dual voltage regulator which are both available from C. E. Niehoff & Co. of Evanston, Ill. The regulator 15 excites the alternator field to produce output power. When the output voltage of the alternator 14 rises to the regulated level, for example 24.5 volts in the present embodiment, the LBCD 12 becomes active and closes the battery relay 18.

Because the battery in the system may be undercharged, closing the relay 18 may cause the regulated voltage to drop, but as long as the alternator 14 is powered and there is sufficient alternator capacity, the voltage will return to the regulated setting. With the voltage at the regulated level, the regulator 15 switches off the field coil, and the alternator output voltage begins to drop. At this point normal operation continues with the voltage regulator switching the field coil on and off as needed to maintain the regulated voltage while the LBCD 12 controlled relay remains closed. This represents normal operation.

If closing the relay 18 causes the alternator output voltage to drop below a programmed threshold, e.g. below 20.5 Volts for a 28 Volt operating system, it is apparent that the load created by recharging the battery exceeds the generator capacity, and the LBCD 12 will open the relay. The relay may be any type of mechanical relay or semiconductor switch of appropriate rating. When the relay 18 disconnects the battery 18 from the alternator 14 and the rest of the circuit, the system voltage is expected to return to its regulated setting. The alternator 14 is now operating either without any battery in the system or, in embodiments where there are multiple batteries in the vehicle electrical system, it is operating with an auxiliary battery that is now also isolated from the disconnected battery 16. In this mode, the LBCD 12 actively controls the trickle charge to the disconnected battery by controlling the SCR 27 in the circuit 32 to provide a programmed charge to the disconnected battery over the trickle charge/sense line 22.

Figure 3:
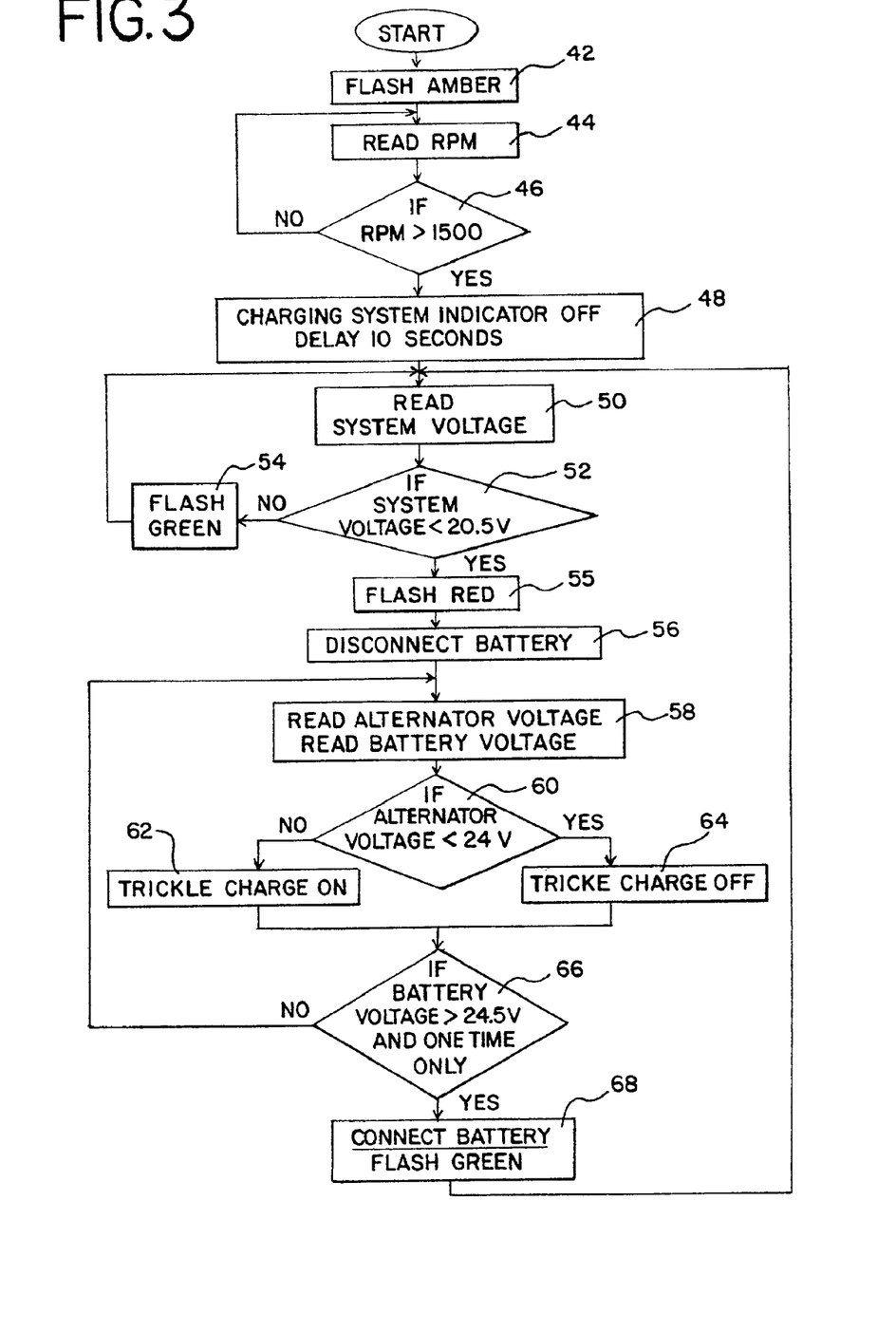
FIG. 3 is a flow chart illustrating one preferred method of controlling load and battery charge in the electrical system of FIG. 1.

Referring to FIG. 3, an example of one method of implementing the LBCD 12 is illustrated. After the vehicle is started the engine begins to drive the alternator and the processor module 34 of the LBCD 12 begins to receive AC power on the AC sense line 26. The diagnostic LED 30 is then activated by the processor module 34 so that a blinking amber light is shown (at 42). The blinking amber light provides an indication that the system voltage is below the regulated voltage setting, and this is normal in start up mode. In one embodiment, the processor module 34 may be programmed to monitor the AC frequency of power coming in on the AC sense line 26 to calculate the alternator RPM.

The processor module 34 will wait until the measured alternator RPM is above the program threshold, in this example 1500 RPM, so that the LBCD recognizes that the vehicle has achieved its programmed idle speed (at 46).

As soon as the processor module 34 determines that the alternator 14 has reached the necessary minimum RPM setting, which preferably represents the steady state RPM of the alternator while the vehicle engine is idling, the processor module 34 activates transistor Q1 so that the charging system indicator light 28 seen by the vehicle driver turns off (at 48). The LBCD 12 then reads the system voltage by detecting the voltage over the voltage sense line 38 connected to the processor module 34 (at 50). Assuming that the voltage along the voltage sense line 38 is above a predetermined threshold, the diagnostic LED 30 on the LBCD 12 will flash green to indicate that the electrical system 10 is behaving normally and that the battery 16 is not drawing such a large charge current that the system voltage is adversely effected (at 52, 54). If, however, the voltage measured on the voltage sense line 38 is less than the predetermined threshold, then the processor module 34 causes the diagnostic LED to flash red and activates transistor U2 to send a signal along the disconnect line 20 such that the battery disconnect switch 18 opens and removes the battery 16 from the circuit (at 55, 56). In one embodiment, where the system regulated voltage is programmed to be 28.0 Volts, the threshold system voltage that triggers the LBCD 12 to remove the battery from the system may be set at, for example, 20.5 volts. The threshold voltage that is programmed into the processor module 34 may be any desired threshold voltage and both the programmed voltage and threshold may be adjusted for any desired system in other embodiments.

After the LBCD 12 has disconnected the battery 16 from the vehicle electrical system 10 by opening the battery disconnect switch 18, the LBCD 12 checks to see if the system voltage returns to the programmed voltage level and reads the battery voltage level (at 58). The processor module 34 reads the alternator voltage at the voltage sense line 38 and reads the battery voltage from the trickle charge/sense line 22. As long as the alternator voltage sensed at sense line 38 is at or above the programmed system threshold, the processor module activates the SCR via the optocoupler U4 to pass a trickle charge to the battery 16 (at 60, 62). Alternatively, if the alternator voltage is below the preset threshold, the processor module 34 keeps the SCR shut off so that no trickle charge is drawn away from the alternator to recharge the battery (at 64). The charging cycle for the battery will continue until the battery reaches its optimum charge level as determined by the voltage measured on line 22 by the processor module 34.

Once, the LBCD detects that the battery 16 has been recharged, it will signal the relay 18 to reconnect the battery 16 to the vehicle electrical system 10 and the LED 30 will be instructed to flash green indicating that the battery is now connected to the system and possesses an acceptable charge (at 66, 68). In one embodiment the LBCD may maintain an instruction loop counter in the programming stored in the memory of the microprocessor in the processor module 34 so that the LBCD 12 may recognize if the battery needs to be charged more than one time during any given operation of the vehicle from start to shut off. If the battery voltage level drops such that it needs to be disconnected a second time from the system 10 during operation of the vehicle, it is left permanently disconnected and the charging system indicator light is illuminated to indicate a serious problem with the battery that may require replacement. This feature is determined by the application and, in some cases, may not be limited to a single permissible event, but rather include multiple battery disconnects during the course of an operating cycle.

In one preferred embodiment, the trickle charge to the disconnected battery may be controlled by the SCR 27. The processor module 34 may instruct the optocoupler U4 to turn on and off a gate voltage at the SCR 27 to ensure the trickle charge does not cause the alternator to exceed its power capacity. As long as excess alternator capacity is available to charge the disconnected battery, SCR 27 will be turned on by the processor module 34. Battery charge rate is determined by the charge voltage, and by this means the disconnected battery is charged at a rate independent of the vehicle electrical system voltage. In one embodiment, the processor module monitors the duty cycle of the field coil in the alternator to determine when to turn the SCR 27 on or off. In alternative embodiments, the trickle charge circuit can have components added to increase the battery charge voltage above the regulated voltage, but such a circuit would demand more alternator power also. An advantage of such a circuit would be to totally decouple the battery charging voltage from the vehicle electrical system regulated voltage.

As described above, the LBCD can determine if a recoverable low charge state, unrecoverable low charge state, or short circuit exists in the rechargeable energy storage device or battery used with this system. This is a function of the load drawn from the alternator versus the regulated voltage and the voltage at the disconnected battery. The inability to maintain regulated voltage is the condition that causes the battery to be disconnected from the vehicle electrical system. When voltage regulation is restored after the battery is disconnected, the source of overload is validated, and the trickle charge circuit becomes the means to restore charge to the disconnected battery. Alternator voltage and battery voltage are read (FIG. 3 at 58). If the alternator voltage is below 24.0 Volts, the SCR 27 is turned off (FIG. 3 at 64) because the alternator field is already full on at this voltage for a 28.0 Volt regulated setting. If the alternator voltage is above 24.0 Volts, there is some excess capacity available from the alternator, and so the SCR 27 is turned on (FIG. 3 at 62) to recharge the disconnected battery. This process continues until the disconnected battery voltage is read to be greater than 24.5 Volts (FIG. 3 at 66). This condition confirms the disconnected battery is now recharged to a state that will not upset the ability of the alternator to maintain the regulated voltage when the battery is reconnected into the vehicle electrical system. Reconnecting the recharged battery into the vehicle electrical system restores normal operation and the LBCD LED 30 is made to flash green (FIG. 3 at 68) to signify normal operating state.

In one embodiment, the LED 28 is employed to indicate that the alternator is not producing output. LED 28 is off when the alternator is in a normal operating state. When there is no battery in the electrical system, a panel light such as LED 28 may be flashed to alert the operator that the battery is disconnected because the vehicle may not be able to self start if the engine is stopped during this mode of operation. If the disconnected battery accepts the recharge current, the battery becomes recharged, and the relay 18 is closed to restore the battery into the vehicle electrical system, then LED 28 is turned off and the vehicle resumes normal vehicle electrical system operation. If the LBCD determines the alternator is not producing output, the panel light LED 28 is illuminated, and it remains illuminated, to indicate that the alternator 14 must be serviced. In one preferred embodiment, the LBCD 12 contains a program with instructions to implement the process set forth in FIG. 3. The program may be a C program, such as set forth in the attached CD-ROM appendix, that is compiled as necessary into machine code appropriate for the selected processor module and stored in local memory, such as the integral flash memory of the Motorola 68C08 processor mentioned above.

If the system is operating normally with the battery relay closed, and an overload in the battery circuit subsequently causes the regulated voltage to drop below the programmed threshold, the LBCD 12 repeats its cycle of opening the relay 18 and executing the bypass recharge sequence of FIG. 3 until normal operation is resumed.

Although the embodiment of FIG. 1 illustrates a two battery system, it is contemplated that the system and method for controlling load and battery charge may be applied to a system using one battery or any configuration of multiple batteries. Further, in systems using more than one battery, one or more of these batteries may each be controllably disconnected and charged by a LBCD simultaneously or in a desired sequence. In yet other embodiments, the LBCD may be configured to maintain a battery charge that is higher than the alternator output by adding a transformer or other step-up circuit to the trickle charge/sense line. For energy storage systems that employ capacitors, the LBCD can be used to selectively charge discrete sets of these to programmed levels via the trickle charge circuit.

From the foregoing, a method and system for controlling load and battery charge in a vehicle has been described. The disclosed method and system helps address the problem of undercharged batteries in vehicle electrical systems that can compromise the ability to maintain a regulated voltage due recharge demands of the battery. One solution to this situation is to disconnect the battery from the electrical system using a relay and to charge the battery independently of the main electrical power. The disclosed processor controlled relay and the independently controlled charging circuit, such as a processor controlled SCR removes the main system voltage from being the controlling factor in recharging the battery. By utilizing this bypass charging circuit to charge the disconnected battery or batteries, the disclosed system can restore charge to the battery using only spare generator capacity. The disclosed system is able to filter the alternator ripple voltage to levels commensurate with the presence of a battery in the system. When the disconnected battery charge reaches its normal level, the relay can be closed to restore normal system operation with the battery in the circuit.

An advantage of the disclosed method and system is that the battery can remain connected to the system if it has sufficient charge, but if the vehicle battery is so severely discharged that it impairs normal alternator operation by overloading the system with its demand for a recharging current, the LBCD may entirely decouple the battery from the system load so that the vehicle operates without any battery and still maintains low ripple voltage in the electrical system. Another advantage is that the disconnected battery may be controllably recharged at an adjustable rate that only takes excess capacity from the alternator to recharge the battery. Additionally, the disclosed system and method allows for maintaining a different voltage on the battery than is necessary at the load for the system so that, for example, a battery may be maintained at a reduced voltage during high temperature operation according to the operating constraints from the battery manufacturer, while maintaining the appropriate voltage level for the remainder of the electrical components in the vehicle electrical system. It is therefore intended that the foregoing detailed description be regarded as illustrative rather than limiting, and that it be understood that it is the following claims, including all equivalents, that are intended to define the spirit and scope of this invention.

We claim:

1. A system for monitoring vehicle electrical load and controlling battery charge comprising:
   a generator electrically coupled with a vehicle electrical system;
   a battery electrically coupled with the vehicle electrical system via a battery disconnect switch; and
   a control circuit in communication with the battery disconnect switch, wherein the control circuit is configured to control the battery disconnect switch to disconnect the battery from the vehicle electrical system when a voltage output of the generator is below a desired threshold, and wherein the control circuit is configured to control the battery disconnect switch to reconnect the battery to the vehicle electrical system when a voltage of the battery is above a desired battery voltage threshold, and wherein the control circuit is configured to regulate a battery charging voltage with excess generator capacity while the battery is disconnected from the vehicle electrical system.

2. The system of claim 1, wherein the control circuit further comprises a battery charging circuit.

3. The system of claim 2, wherein the battery charging circuit comprises a silicon controlled rectifier.

4. The system of claim 3, wherein the control circuit is configured to automatically adjust a duty cycle of the silicon controlled rectifier to adjust a rate of battery recharge.

5. The system of claim 4, wherein the control circuit comprises a voltage sense input and wherein the control circuit is configured to adjust the duty cycle of the silicon controlled rectifier in response to a generator voltage detected at the voltage sense input.

6. The system of claim 2, wherein the control circuit is configured to adjust a rate of battery recharge via the battery charging circuit.

7. The system of claim 2 wherein the control circuit is adapted to switchably connect a trickle charge line in communication with the battery to power produced by the generator while the battery is disconnected from the vehicle electrical system.

8. The system of claim 1, wherein the generator comprises an alternator.

9. The system of claim 8 wherein the alternator comprises a three phase alternator and the control circuit further comprises a battery charging circuit switchably connecting a trickle charge line in communication with the battery to a single phase output of the three phase alternator.

10. The system of claim 1, wherein the control circuit comprises a ripple filter.

11. The system of claim 10 wherein the ripple filter comprises an input coupled to the voltage output of the generator and an output coupled to the vehicle electrical system, wherein a ripple voltage of the voltage output is controlled when the battery is disconnected from the vehicle electrical system.

12. The system of claim 11, wherein the ripple voltage is reduced when the battery is disconnected from the vehicle electrical system.

13. A control circuit for controlling a rate of recharge of a battery in a vehicle electrical system, wherein the vehicle electrical system is powered by an alternator during vehicle operation, the control circuit comprising:
   a battery disconnect switch disposed between the battery and the vehicle electrical system operable to electrically disconnect the battery from the vehicle electrical system;
   a battery charging circuit in electrical communication with the battery and the alternator;
   a processor in communication with the battery disconnect switch and the battery charging circuit; and
   programming code operable on the processor to disconnect the battery from the vehicle electrical system with the battery disconnect switch in response to an alternator voltage output below a threshold value, and to control a recharge rate for the battery with the battery charging circuit while the battery is disconnected from the vehicle electrical system.

14. The control circuit of claim 13, wherein the battery charging circuit comprises a silicon controlled rectifier.

15. A The control circuit of claim 13, wherein the battery disconnect switch comprises a relay.

16. The system of claim 13, wherein the control circuit further comprises a ripple filter having an input coupled to the alternator voltage output and an output coupled to the vehicle electrical system, wherein a ripple voltage of the alternator voltage output is reduced when the battery is disconnected from the vehicle electrical system.

17. A method for controlling electric load and battery charge in a vehicle electrical system, the method comprising:
   (a) disconnecting a rechargeable source of stored energy from the vehicle electrical system if a voltage at the vehicle electrical system falls below a first threshold;
   (b) controllably charging the rechargeable source of stored energy with energy from a generator in the vehicle electrical system such that an operating voltage of the vehicle electrical system remains above an operating voltage threshold; and
   (c) reconnecting the rechargeable source of stored energy to the vehicle electrical system when a voltage at the rechargeable source of stored energy is above a desired voltage threshold, wherein the vehicle electrical system operates with energy from the generator while the rechargeable source of stored energy is disconnected and being recharged.

18. The method of claim 17, wherein (a) comprises sensing the output voltage of the generator, comparing the output voltage of the generator to the first threshold, and operating a relay to disconnect the rechargeable source of stored energy if the sensed output voltage of the generator is less than the first threshold.

19. The method of claim 17, wherein (b) further comprises controllably charging the rechargeable source of stored energy by adjusting a duty cycle of a switchable device connecting the rechargeable source of stored energy to the generator.

20. The method of claim 19, wherein the switchable device comprises a silicon controlled rectifier.

21. The method of claim 17, wherein the rechargeable source of stored energy comprises a battery.

22. The method of claim 17, wherein (b) further comprises signaling a warning to a vehicle operator while the source of stored of stored energy is disconnected from the vehicle electrical system.

23. The method of claim 17, wherein (c) further comprises reconnecting the rechargeable source of stored energy to the vehicle electrical system when a voltage at the rechargeable source of stored energy is maintained at a different voltage level than the operating voltage of the vehicle electrical system above a desired voltage threshold.

24. The method of claim 17, wherein the generator comprises an alternator having a three phase AC output and (b) further comprises controllably charging the source of stored energy with at least one phase of the three phase AC output of the alternator.

25. A control circuit for controlling a rate of recharge of a battery in a vehicle electrical system and maintaining separate load and trickle charge voltage levels, wherein the vehicle electrical system is powered by a generator during vehicle operation, the control circuit comprising:

a battery disconnect switch disposed between the battery and the vehicle electrical system operable to electrically disconnect the battery from the vehicle electrical system and to reconnect the battery to the vehicle electrical system;

a battery charging circuit in electrical communication with the battery and the generator;

a processor in communication with the battery disconnect switch and the battery charging circuit; and programming code operable on the processor to disconnect the battery from the vehicle electrical system with the battery disconnect switch in response to a generator voltage output below a threshold value, to control a recharge rate for the battery with the battery charging circuit while the battery is disconnected from the vehicle electrical system, and to reconnect the battery to the vehicle electrical system in when the generator voltage output is above the threshold value.

26. The system of claim 25 wherein the generator comprises an alternator.

27. The system of claim 26 wherein the control circuit further comprises a ripple filter.

28. The system of claim 26 wherein the ripple filter comprises an input coupled to the alternator voltage output and an output coupled to the vehicle electrical system, wherein a ripple voltage of the alternator output voltage is controlled when the battery is disconnected from the vehicle electrical system.

* * * * *

UNITED STATES PATENT AND TRADEMARK OFFICE
CERTIFICATE OF CORRECTION

| | | |
|---|---|---|
| PATENT NO. | : 6,924,621 B2 | |
| APPLICATION NO. | : 10/140901 | |
| DATED | : August 5, 2005 | |
| INVENTOR(S) | : I. Jabajii et al. | |

It is certified that error appears in the above-identified patent and that said Letters Patent is hereby corrected as shown below:

IN THE DRAWINGS

The drawing sheet 2 of 3 consisting of fig. 2 should be deleted and substitute therefore the attached drawing sheet consisting of Fig. 2.

Signed and Sealed this

Twelfth Day of December, 2006

JON W. DUDAS
*Director of the United States Patent and Trademark Office*

FIG.2

UNITED STATES PATENT AND TRADEMARK OFFICE
CERTIFICATE OF CORRECTION

| | |
|---|---|
| PATENT NO. | : 6,924,621 B2 |
| APPLICATION NO. | : 10/140901 |
| DATED | : August 2, 2005 |
| INVENTOR(S) | : I. Jabajii et al. |

It is certified that error appears in the above-identified patent and that said Letters Patent is hereby corrected as shown below:

IN THE DRAWINGS

The drawing sheet 2 of 3 consisting of fig. 2 should be deleted and substitute therefore the attached drawing sheet consisting of Fig. 2.

This certificate supersedes Certificate of Correction issued December 12, 2006.

Signed and Sealed this

Ninth Day of January, 2007

JON W. DUDAS
*Director of the United States Patent and Trademark Office*

FIG. 2

UNITED STATES PATENT AND TRADEMARK OFFICE
CERTIFICATE OF CORRECTION

| | | |
|---|---|---|
| PATENT NO. | : 6,924,621 B2 | |
| APPLICATION NO. | : 10/140901 | |
| DATED | : August 2, 2005 | |
| INVENTOR(S) | : I. Jabaji et al. | |

It is certified that error appears in the above-identified patent and that said Letters Patent is hereby corrected as shown below:

IN THE DRAWINGS

The drawing sheet 2 of 3 consisting of fig. 2 should be deleted and substitute therefore the attached drawing sheet consisting of Fig. 2.

This certificate supersedes Certificate of Correction issued December 12, 2006 and January 9, 2007.

Signed and Sealed this

Tenth Day of April, 2007

JON W. DUDAS
*Director of the United States Patent and Trademark Office*

FIG. 2